United States Patent
Sekiguchi et al.

(10) Patent No.: US 10,934,963 B2
(45) Date of Patent: Mar. 2, 2021

(54) ABNORMALITY ASSESSMENT DEVICE OF INTERNAL COMBUSTION ENGINE

(71) Applicant: HONDA MOTOR CO., LTD., Tokyo (JP)

(72) Inventors: Toru Sekiguchi, Wako (JP); Takashi Konomoto, Wako (JP); Hiroki Ishikawa, Wako (JP); Taku Hirota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/742,089

(22) Filed: Jan. 14, 2020

(65) Prior Publication Data

US 2020/0256276 A1    Aug. 13, 2020

(30) Foreign Application Priority Data

Feb. 8, 2019    (JP) .............................. JP2019-021329

(51) Int. Cl.

| | | |
|---|---|---|
| F02D 41/22 | (2006.01) | |
| F02M 35/08 | (2006.01) | |
| F02D 9/02 | (2006.01) | |
| F02M 25/06 | (2016.01) | |
| F01M 13/00 | (2006.01) | |
| F01M 13/02 | (2006.01) | |
| F02B 37/00 | (2006.01) | |
| F02M 35/10 | (2006.01) | |

(52) U.S. Cl.
CPC ....... *F02D 41/222* (2013.01); *F01M 13/0011* (2013.01); *F01M 13/028* (2013.01); *F02B 37/00* (2013.01); *F02D 9/02* (2013.01); *F02M 25/06* (2013.01); *F02M 35/08* (2013.01); *F02M 35/10222* (2013.01); *F01M 2250/00* (2013.01)

(58) Field of Classification Search
CPC ..... F02D 41/222; F02D 9/02; F01M 13/0011; F01M 13/028; F02B 37/00
See application file for complete search history.

(56) References Cited

U.S. PATENT DOCUMENTS

| 9,068,486 B2 | 6/2015 | Rollinger et al. |
| 2014/0081549 A1 | 3/2014 | Rollinger et al. |
| 2016/0348614 A1* | 12/2016 | Dudar ..................... B60T 13/46 |

FOREIGN PATENT DOCUMENTS

| JP | 7-166974 A | 6/1995 |
| JP | 2000-110674 A | 4/2000 |

(Continued)

OTHER PUBLICATIONS

Office Action dated Aug. 5, 2020, issued in counterpart JP Application No. 2019-021329, with English translation (7 pages).

*Primary Examiner* — Kevin A Lathers
(74) *Attorney, Agent, or Firm* — Westerman, Hattori, Daniels & Adrian, LLP

(57) ABSTRACT

An internal combustion engine includes on-off valves that configure a closed space by closing an internal space of a breather line, a pump that depressurizes or pressurizes the closed space, a pressure sensor that detects a pressure of the closed space, and an abnormality assessment element that assesses abnormality of the breather line. The abnormality assessment element assesses abnormality of the breather line based on a pressure change of the closed space in a case where the closed space is depressurized or pressurized by the pump.

6 Claims, 4 Drawing Sheets

(56) References Cited

FOREIGN PATENT DOCUMENTS

| JP | 2004-332726 A | | 11/2004 |
|---|---|---|---|
| JP | 2011-127579 A | | 6/2011 |
| JP | 2015-121195 A | | 7/2015 |
| JP | 2016020675 A | | 2/2016 |
| JP | 2016-079915 A | | 5/2016 |
| JP | 2017-78378 A | | 4/2017 |
| JP | 2018044486 A | * | 3/2018 |

* cited by examiner

ABNORMALITY ASSESSMENT DEVICE OF INTERNAL COMBUSTION ENGINE

CROSS REFERENCES TO RELATED APPLICATIONS

The present application claims priority under 35 U.S.C. § 119 to Japanese Patent Application No. 2019-021329, filed Feb. 8, 2019, entitled "Abnormality Assessment Device of Internal Combustion Engine." The contents of this application are incorporated herein by reference in their entirety.

TECHNICAL FIELD

The present disclosure relates to an abnormality assessment device of an internal combustion engine in which an air cleaner, a forced-induction compressor, and a throttle valve are in order arranged from an upstream side toward a downstream side of an intake path which starts from an intake port and reaches an intake manifold, the intake path on a downstream side of the throttle valve is connected with a crankcase via a PCV line, and the intake path between the air cleaner and the forced-induction compressor is connected with the crankcase via a breather line.

BACKGROUND

Japanese Unexamined Patent Application Publication No. 2017-078378 discloses such an abnormality assessment device of an internal combustion engine as a second embodiment, for example. The abnormality assessment device of an internal combustion engine focuses on a fact that in a case where a connection portion of a breather line with respect to an intake path is detached, the connection portion becomes an opening end portion of an air column of the intake path and the resonance frequency of the air column thereby changes, monitors the magnitude of pulsation of the intake flow rate of the intake path, and thereby makes an assessment about detachment of the connection portion of the breather line.

SUMMARY

Incidentally, because the pressure pulsation in a crankcase is lessened as the number of cylinders of an internal combustion engine is increased, the pulsation of the intake flow rate of an intake path which occurs due to the pressure pulsation of the crankcase becomes small. Thus, in the abnormality assessment device that is disclosed in Japanese Unexamined Patent Application Publication No. 2017-078378 and makes an assessment about detachment of a connection portion of a breather line based on the magnitude of pulsation of an intake flow rate of an intake path, the precision of abnormality assessment possibly lowers.

It is desirable to certainly assess abnormality of a breather line of an internal combustion engine.

A first aspect of the present disclosure suggests an abnormality assessment device of an internal combustion engine, the internal combustion engine in which an air cleaner, a forced-induction compressor, and a throttle valve are in order arranged from an upstream side toward a downstream side of an intake path which starts from an intake port and reaches an intake manifold, the intake path on a downstream side of the throttle valve is connected with a crankcase via a PCV line, and the intake path between the air cleaner and the forced-induction compressor is connected with the crankcase via a breather line. The abnormality assessment device includes: on-off valves that configure a closed space by closing an internal space of the breather line; a pump that depressurizes or pressurizes the closed space; a pressure sensor that detects a pressure of the closed space; and an abnormality assessment element that assesses abnormality of the breather line. The abnormality assessment element assesses abnormality of the breather line based on a pressure change of the closed space in a case where the closed space is depressurized or pressurized by the pump.

In a configuration of the first aspect, blowby gas in the crankcase may be returned to the intake path through the PCV line or the breather line.

Further, even in a case where pulsation of the intake flow rate of the intake path is small because the number of cylinders of the internal combustion engine is large, abnormality of the breather line may precisely be assessed.

In addition to the configuration of the first aspect, a second aspect of the present disclosure suggests the abnormality assessment device of an internal combustion engine, in which the on-off valves may include a first on-off valve which blocks a first connection portion of the breather line with respect to the intake path and a second on-off valve which blocks a second connection portion of the breather line with respect to the crankcase.

In a configuration of the second aspect, even if abnormality occurs in any part of the breather line, an abnormality assessment may be performed by certainly detecting the abnormality.

Further, in addition to the configuration of the first aspect, a third aspect of the present disclosure suggests the abnormality assessment device of an internal combustion engine, in which the on-off valves may include a first on-off valve which blocks a first connection portion of the breather line with respect to the intake path and a second on-off valve which blocks a second connection portion of the PCV line with respect to the crankcase.

In a configuration of the third aspect, even if abnormality occurs in any part of the breather line, an abnormality assessment may be performed by certainly detecting the abnormality, and abnormality of the crankcase may be detected as well.

Note that a first on-off valve 25 and a second on-off valve 26 in embodiments correspond to the on-off valves of the present disclosure, and a decompression pump 28 in the embodiments corresponds to the pump of the present disclosure.

BRIEF DESCRIPTION OF THE DRAWINGS

The advantages of the disclosure will become apparent in the following description taken in conjunction with the following drawings.

DETAILED DESCRIPTION

First Embodiment

A first embodiment of the present disclosure will hereinafter be described based on FIG. 1 to FIG. 4.

Figure 1:
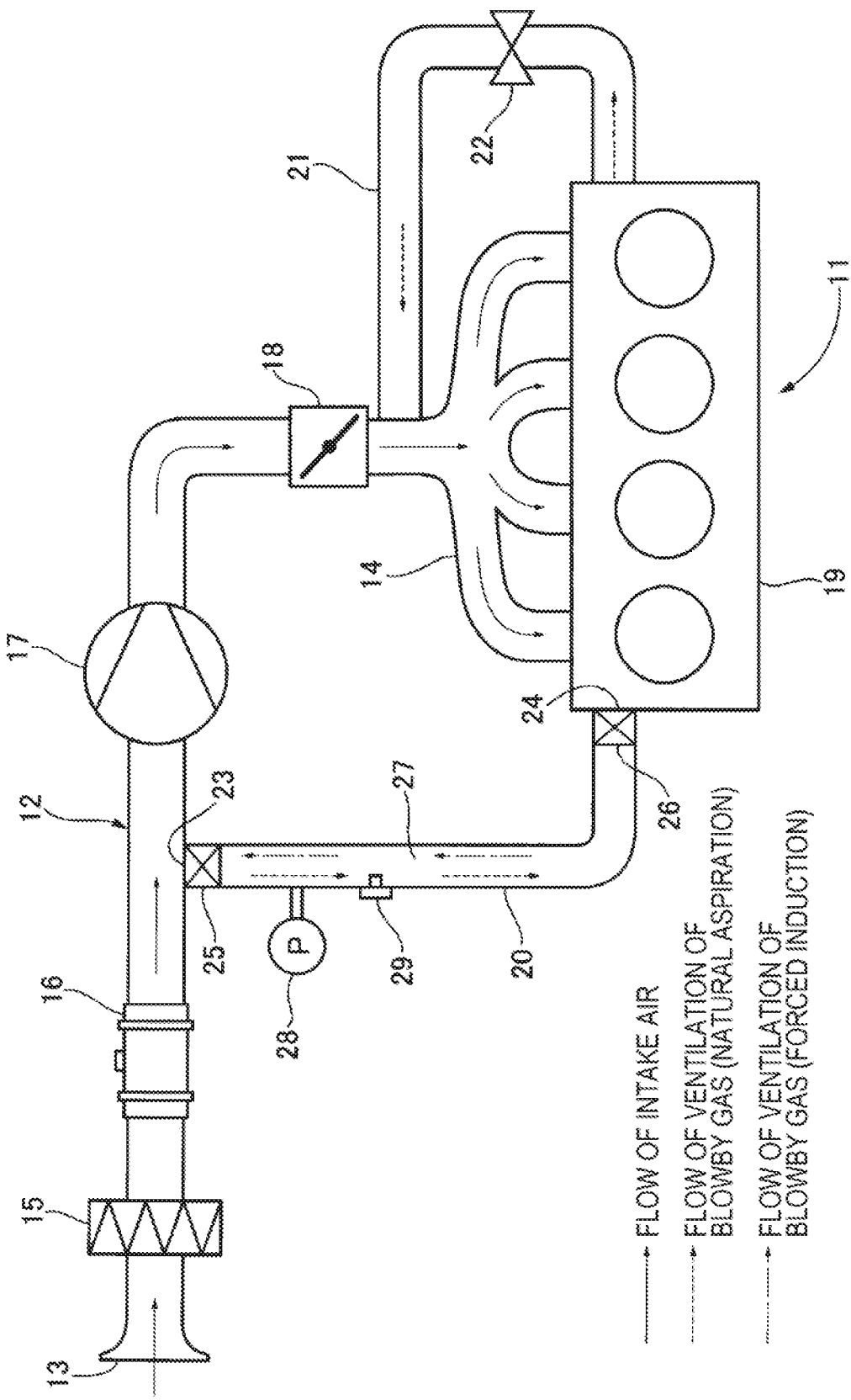
FIG. 1 is a diagram that illustrates a configuration of an internal combustion engine which includes an abnormality assessment device of a breather line. (First embodiment)

As illustrated in FIG. 1, on an intake path 12 of an in-line four-cylinder four-cycle internal combustion engine 11 that is mounted on an automobile, from an intake port 13 at an upstream end in an intake flow direction toward an intake manifold 14 at a downstream end in the intake flow direction, an air cleaner 15 that removes dust in intake air, an air flow meter 16 that measures an intake flow rate, a forced-induction compressor 17 formed with a turbocharger or a supercharger that pressurizes the intake air, and a throttle valve 18 that throttles the intake path 12 and thereby adjusts the intake flow rate are arranged in order. A position interposed between the air flow meter 16 and the forced-induction compressor 17 in the intake path 12 is connected with a crankcase 19 of the internal combustion engine 11 by a breather line 20. Further, the intake manifold 14 and the crankcase 19 of the internal combustion engine 11 are connected together by a positive crankcase ventilation (PCV) line 21, and an intermediate portion of the PCV line 21 is opened and closed by a PCV valve 22.

Blowby gas as a portion of fuel components included in the intake air, which flows from a combustion chamber of the internal combustion engine 11 into the crankcase 19 while passing through gaps between pistons and cylinders, is returned to the intake path 12 through the breather line 20 or is returned to the intake path 12 through the PCV line 21, and emission of the fuel components included in the blowby gas to the atmosphere is thereby inhibited.

That is, in a case where the PCV valve 22 is opened in natural aspiration in which the forced-induction compressor 17 does not operate, the atmospheric pressure acts on the intake path 12 on an upstream side of the throttle valve 18, but an intake negative pressure of the internal combustion engine 11 acts on the intake path 12 on a downstream side of the throttle valve 18. Thus, the intake air of the intake path 12 on the upstream side of the throttle valve 18 passes through the breather line 20, flows into the crankcase 19, is returned together with the blowby gas from there to the intake manifold 14 through the PCV line 21, and is finally, together with the intake air, supplied to the combustion chamber of the internal combustion engine 11.

Further, in forced induction in which the forced-induction compressor 17 operates, a forced induction pressure acts on the intake path 12 on a downstream side of the forced-induction compressor 17. However, the PCV valve 22 is closed, and the forced induction pressure is thereby inhibited from being dispersed to the crankcase 19 via the PCV line 21. Then, the blowby gas in the crankcase 19 is drawn to the intake path 12 by a negative pressure that occurs on an upstream side of the operating forced-induction compressor 17 and is, together with the intake air, supplied from there to the combustion chamber of the internal combustion engine 11 through the intake path 12.

Incidentally, in a case where a first connection portion 23 at which the breather line 20 is connected with the intake path 12 is detached in the forced induction of the internal combustion engine 11 or a case where a second connection portion 24 at which the breather line 20 is connected with the crankcase 19 is detached, the blowby gas that flows from the crankcase 19 toward the intake path 12 through the breather line 20 is possibly emitted to the atmosphere. Thus, it is requested to detect such abnormality of the breather line 20 and to issue an alarm.

Thus, in this embodiment, a first on-off valve 25 that opens and closes the breather line 20 in the first connection portion 23 and a second on-off valve 26 that opens and closes the breather line 20 in the second connection portion 24 are provided. When the first on-off valve 25 and the second on-off valve 26 are closed, a closed space 27 is configured in an internal portion of the breather line 20. However, in a case where the breather line 20 is detached at the first connection portion 23 or the second connection portion 24 or a case where an intermediate portion of the breather line 20 is damaged, the closed space 27 of the breather line 20 communicates with the atmosphere. The closed space 27 of the breather line 20 communicates with a decompression pump 28, and it is possible to depressurize the closed space 27 of the breather line 20 to a lower pressure than the atmospheric pressure by driving the decompression pump 28. Then, the pressure of the closed space 27 of the breather line 20 is detected by a pressure sensor 29.

Figure 2:
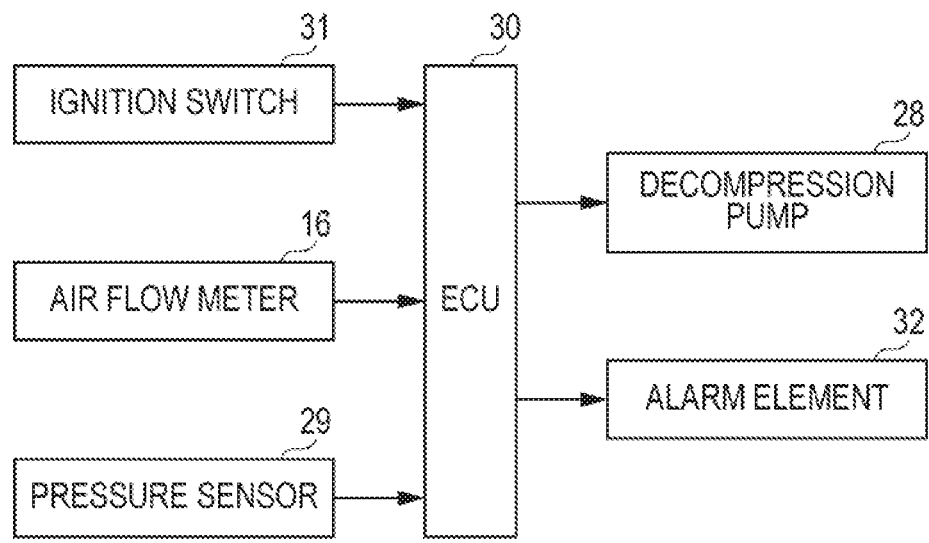
FIG. 2 is a block diagram of the abnormality assessment device of the breather line. (First embodiment)

As illustrated in FIG. 2, with an abnormality assessment element 30 that assesses abnormality of the breather line 20 and is formed with an electronic control unit, an ignition switch 31, the air flow meter 16, the pressure sensor 29, the decompression pump 28, and an alarm element 32 are connected. The alarm element 32 is configured with a liquid crystal panel provided to an instrument panel, for example.

Figure 4:
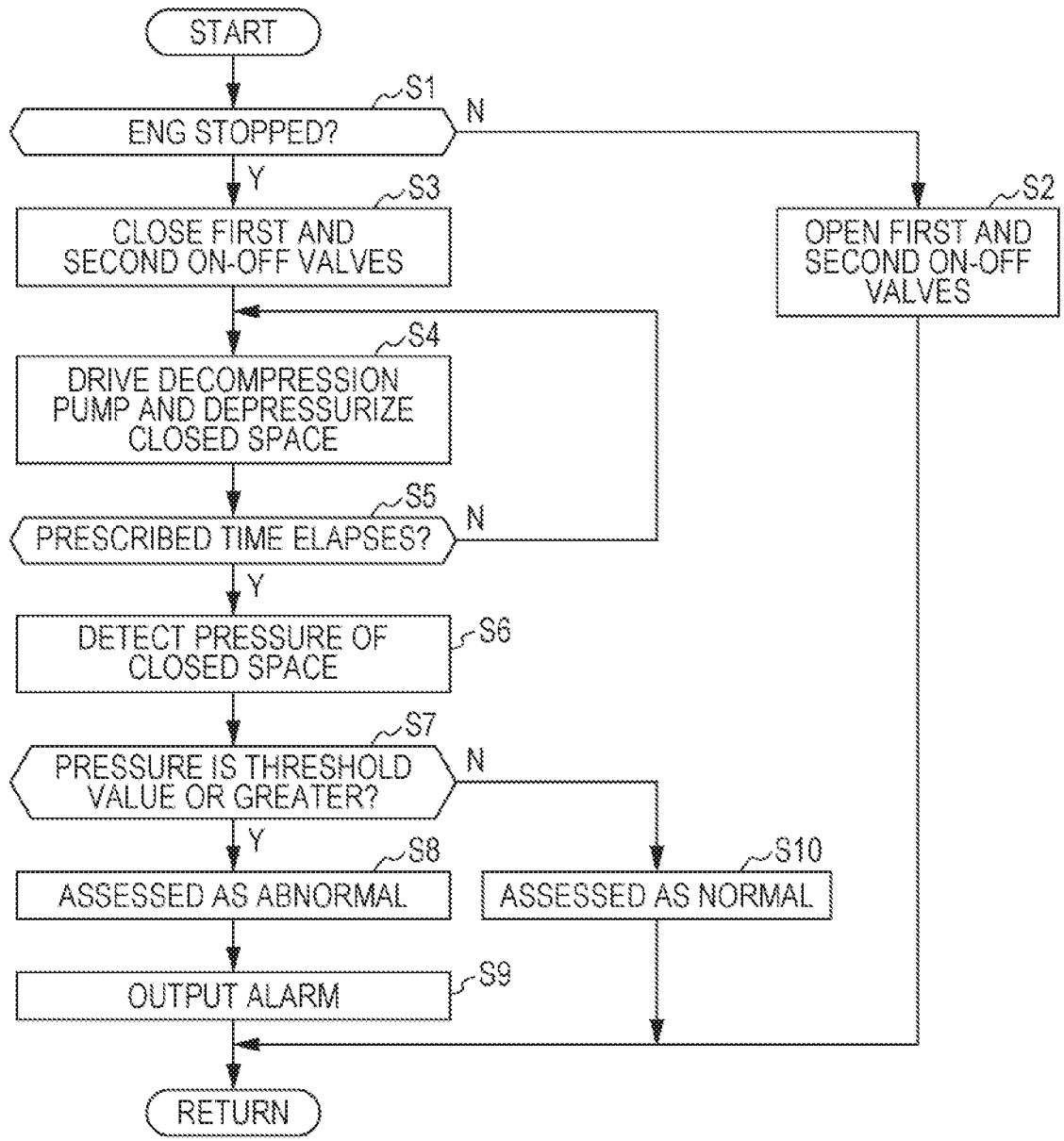
FIG. 4 is a flowchart that illustrates an action of the abnormality assessment device of the breather line. (First embodiment)

Next, a description will be made about an action of the first embodiment of the present disclosure that includes the above configuration based on a flowchart of FIG. 4.

First, in step S1, in a case where it is assessed from the state of the ignition switch 31 that the internal combustion engine 11 is being driven, in step S2, an abnormality assessment of the breather line 20 is suspended, and the first on-off valve 25 and the second on-off valve 26 are opened. On the other hand, in above step S1, in a case where it is assessed from the state of the ignition switch 31 that the internal combustion engine 11 is stopped, in step S3, the first on-off valve 25 and the second on-off valve 26 are closed to configure the closed space 27 in an internal portion of the breather line 20 in order to execute the abnormality assessment of the breather line 20. At the same time, in step S4, the decompression pump 28 is driven, and depressurization of the closed space 27 is thereby started.

In following step S5, in a case where prescribed time requested for the abnormality assessment elapses after an operation of the decompression pump 28, in step S6, the pressure of the closed space 27 is detected by the pressure sensor 29. As a result, in step S7, in a case where the pressure of the closed space 27 is not sufficiently reduced and is a threshold value or greater, in step S8, it is assessed that abnormality occurs to the breather line 20 and the closed space 27 communicates with the atmosphere, and in step S9, an alarm is issued to an occupant by operating the alarm element 32. On the other hand, in above step S7, in a case where the pressure of the closed space 27 is sufficiently reduced and is less than the threshold value, in step S10, it is assessed that leakage to the closed space 27 does not occur and the breather line 20 is normal.

Figure 3:
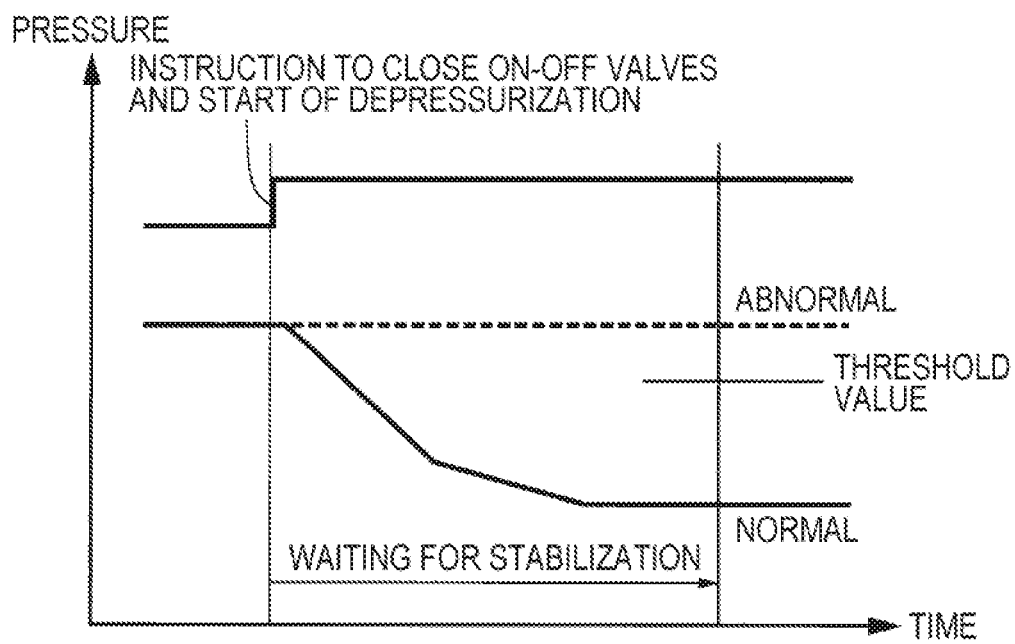
FIG. 3 is a timing diagram for explaining a principle of an abnormality assessment of the breather line. (First embodiment)

That is, as it is clear from a timing diagram of FIG. 3, when the closed space 27 configured by closing the first on-off valve 25 and the second on-off valve 26 is depressurized by the decompression pump 28, in a case where the breather line 20 is normal and the closed space 27 is maintained in a closed state, the pressure of the closed space 27 is properly reduced and becomes less than the threshold value, and it may thereby be assessed that abnormality in which the breather line 20 is detached at the first connection portion 23 or the second connection portion 24 or abnormality in which the intermediate portion of the breather line 20 is damaged does not occur.

Conversely, in a case where the breather line 20 is abnormal and the closed space 27 is not maintained in the closed state, outside air flows into the closed space 27 from an abnormal portion of the breather line 20. Thus, because the pressure of the closed space 27 is not properly reduced, it may be assessed that abnormality occurs to the breather line 20.

Hypothetically, in a case where an attempt is made to assess abnormality of the breather line 20 from a pressure fluctuation of the breather line 20 that occurs in response to vertical movement of the pistons of the internal combustion engine 11 or from an intake flow rate fluctuation of the intake path 12, there is a problem in that the assessment precision lowers because the pressure fluctuation of the breather line 20 or the intake flow rate fluctuation of the intake path 12 is small in the internal combustion engine 11 whose number of cylinders is large. However, in this embodiment, the closed space 27 of the breather line 20 that is closed by the first on-off valve 25 and the second on-off valve 26 is depressurized by the decompression pump 28, and abnormality of the breather line 20 is assessed based on the magnitude of the depressurization. Thus, a highly precise abnormality assessment may be performed regardless of the number of cylinders of the internal combustion engine 11. In addition, because the abnormality assessment may be performed while the internal combustion engine 11 is stopped, travel of a vehicle is not influenced by the output torque of the internal combustion engine 11 that changes due to the abnormality assessment.

Second Embodiment

Figure 5:
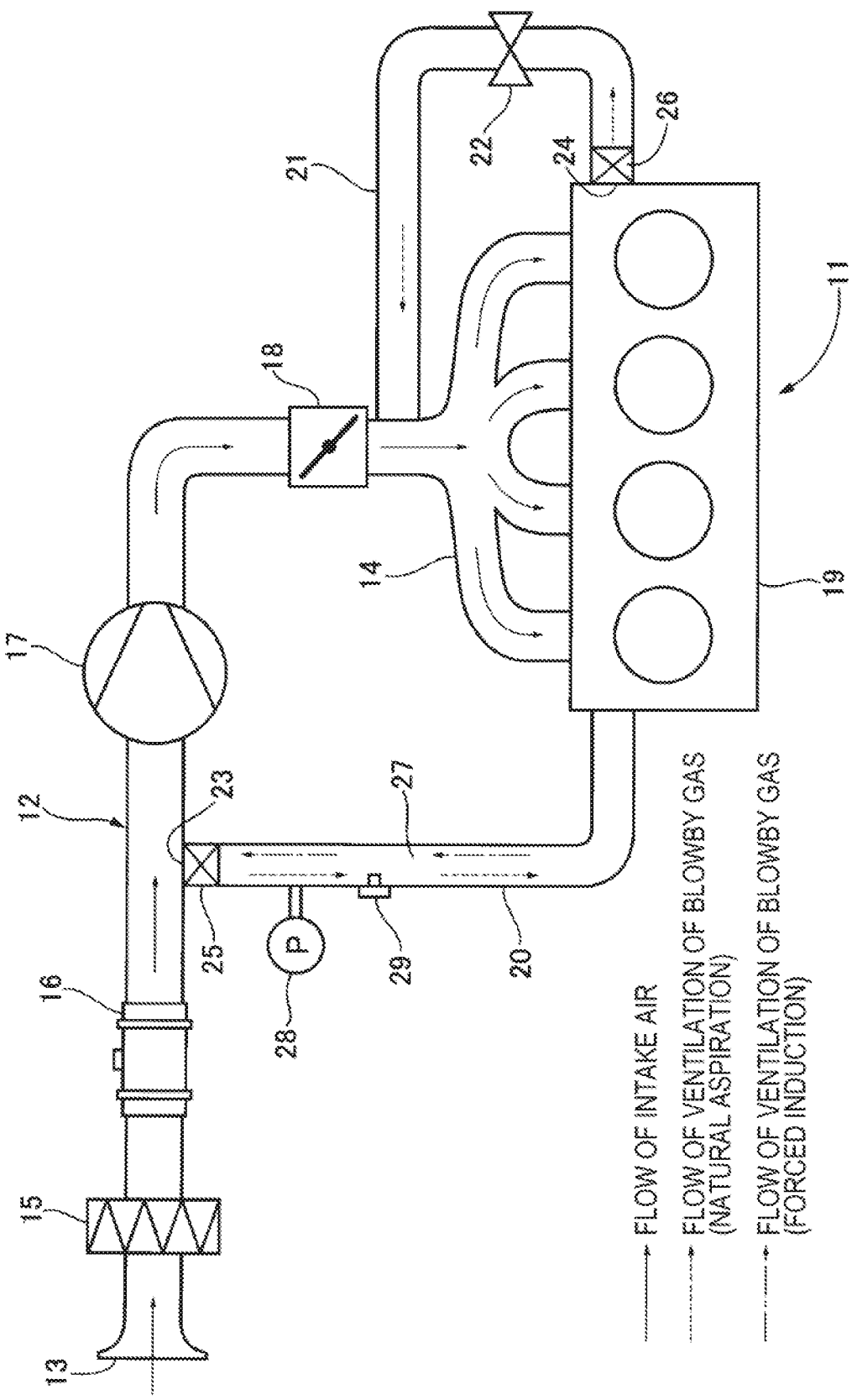
FIG. 5 is a diagram that illustrates a configuration of an internal combustion engine which includes an abnormality assessment device of a breather line. (Second embodiment)

Next, a second embodiment of the present disclosure will be described based on FIG. 5.

The second on-off valve 26 of the first embodiment is provided to the second connection portion 24 in which the breather line 20 is connected with the crankcase 19 (see FIG. 1). However, the second on-off valve 26 of the second embodiment is provided to the second connection portion 24 in which the PCV line 21 is connected with the crankcase 19. Consequently, in the second embodiment, the closed space 27 that is configured when the first on-off valve 25 and the second on-off valve 26 are closed is provided across an internal space of the breather line 20 and an internal space of the crankcase 19.

In the second embodiment, in addition to actions and effects of the first embodiment, the closed space 27 includes both of the internal space of the breather line 20 and the internal space of the crankcase 19. Thus, not only in a case where abnormality occurs to the breather line 20 and the breather line 20 communicates with the atmosphere but also in a case where abnormality occurs to an oil filler cap or an oil level gauge and the crankcase 19 communicates with the atmosphere, it is possible to assess abnormality.

In the foregoing, the embodiments of the present disclosure are described. However, various alterations in design of the present disclosure may be carried out in the scope that does not depart from the gist of the present disclosure.

For example, the number of cylinders of the internal combustion engine 11 is not limited to four cylinders in the embodiments.

Further, in the embodiments, the closed space 27 is depressurized by the decompression pump 28. However, similar actions and effects may be achieved by pressurizing the closed space 27 by a pressurization pump. In this case, in a case where the pressure of the closed space 27 is increased to a threshold value or greater when the closed space 27 is pressurized by the pressurization pump, the breather line 20 is assessed as normal. In a case where the pressure of the closed space 27 is maintained to less than the threshold value, the breather line 20 is assessed as abnormal.

Further, in the embodiments, the breather line 20 and the PCV line 21 are connected with the crankcase 19. However, an internal space of the crankcase 19 and an internal space of a head cover are caused to communicate with each other, the breather line 20 and the PCV line 21 are connected with the head cover, and actions and effects of the present disclosure may thereby be achieved also. Accordingly, configurations in which the breather line 20 and the PCV line 21 are connected with other spaces which communicate with the crankcase 19 are included in the technical scope of the present disclosure.

Further, in the second embodiment, in a case where the PCV valve 22 is provided to a portion in which the PCV line 21 is connected with the crankcase 19, it becomes possible to use the PCV valve 22 as the second on-off valve 26, and the number of components may thereby be reduced. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An abnormality assessment device of an internal combustion engine, the internal combustion engine comprising an air cleaner, a forced-induction system, and a throttle valve which are in this order arranged from an upstream side toward a downstream side of an intake path of the engine which starts from an intake port and reaches an intake manifold, the intake path located on a downstream side of the throttle valve is connected with a crankcase via a positive crankcase ventilation (PCV) line, and the intake path between the air cleaner and the forced-induction system is connected with the crankcase via a breather line, the abnormality assessment device comprising:
   a first on-off valve and a second on-off valve that cause the breather line to have a closed space inside thereof between the first on-off valve and the second on-off valve by closing the first on-off valve and the second on-off valve;
   a pump that depressurizes or pressurizes the closed space;
   a pressure sensor that detects a pressure of the closed space; and
   an abnormality assessment element that assesses abnormality of the breather line, wherein
   the abnormality assessment element assesses abnormality of the breather line based on a pressure change of the closed space after the closed space is caused by closing the first on-off valve and the second on-off valve and the closed space is depressurized or pressurized by the pump.

2. The abnormality assessment device of an internal combustion engine according to claim 1, wherein the breather line includes a first connection portion connected to the intake path and a second connection portion connected to the crankcase, and the first on-off valve blocks the first connection portion and the second on-off valve blocks the second connection portion.

3. The abnormality assessment device of an internal combustion engine according to claim 1, wherein the breather line includes a first connection portion connected to the intake path, the PCV line includes a second connection portion connected to the crankcase, and the first on-off valve blocks the first connection portion and the second on-off valve blocks the second connection portion.

4. The abnormality assessment device of an internal combustion engine according to claim 1, wherein the abnormality assessment element determines occurrence of abnormality of the breather line when the pressure change is less than a threshold.

5. The abnormality assessment device of an internal combustion engine according to claim 3, wherein the second on-off valve also serves as a PCV valve.

6. An abnormality assessment method of an internal combustion engine, the internal combustion engine comprising an air cleaner, a forced-induction system, and a throttle valve which are in this order arranged from an upstream side toward a downstream side of an intake path of the engine which starts from an intake port and reaches an intake manifold, the intake path located on a downstream side of the throttle valve is connected with a crankcase via a positive crankcase ventilation (PCV) line, and the intake path between the air cleaner and the forced-induction system is connected with the crankcase via a breather line, the method comprising steps of:

closing a first on-off valve and a second on-off valve to cause the breather line to have a closed space inside thereof between the first on-off valve and the second on-off valve;

depressurizing or pressurizing by a pump the closed space;

detecting by a pressure sensor a pressure of the closed space; and assessing by a computer abnormality of the breather line based on a pressure change of the closed space after the closed space is caused by closing the first on-off valve and the second on-off valve and the closed space is depressurized or pressurized by the pump.

* * * * *